(12) United States Patent
Oestergren (10) Patent No.: US 7,963,548 B2
(45) Date of Patent: Jun. 21, 2011

(54) FASTENER FOR AIR-BAG CURTAIN

(75) Inventor: Kristian Oestergren, Alingsas (SE)

(73) Assignee: ITW Sverige AB, Moelndal (SE)

( * ) Notice: Subject to any disclaimer, the term of this patent is extended or adjusted under 35 U.S.C. 154(b) by 303 days.

(21) Appl. No.: 11/750,561

(22) Filed: May 18, 2007

(65) Prior Publication Data

US 2007/0296184 A1    Dec. 27, 2007

(30) Foreign Application Priority Data

May 19, 2006    (SE) ...................................... 0601141

(51) Int. Cl.
*B60R 21/213*    (2011.01)
(52) U.S. Cl. ..................... 280/728.2; 280/730.2; 24/297
(58) Field of Classification Search ............... 280/728.2, 280/730.2
See application file for complete search history.

(56) References Cited

U.S. PATENT DOCUMENTS

| | | | | |
|---|---|---|---|---|
| 3,034,800 | A * | 5/1962 | Campbell | 280/18 |
| 5,899,489 | A * | 5/1999 | Jost | 280/730.2 |
| 6,109,645 | A * | 8/2000 | Totani et al. | 280/728.3 |
| 6,234,515 | B1 * | 5/2001 | Iwanaga | 280/728.2 |
| 6,375,863 | B1 * | 4/2002 | Tachikawa et al. | 252/299.01 |
| 6,612,607 | B1 * | 9/2003 | Takahashi | 280/728.3 |
| 6,740,709 | B2 * | 5/2004 | Ono et al. | 525/68 |
| 7,093,849 | B2 * | 8/2006 | Nishijima et al. | 280/728.3 |
| 7,156,413 | B2 * | 1/2007 | Fischer et al. | 280/728.2 |
| 7,182,366 | B2 * | 2/2007 | Enriquez | 280/730.2 |
| 7,216,891 | B2 * | 5/2007 | Biglino | 280/728.2 |
| 2002/0084630 | A1 * | 7/2002 | Aulbach | 280/728.2 |
| 2002/0105172 | A1 * | 8/2002 | Peer et al. | 280/730.2 |
| 2004/0070187 | A1 * | 4/2004 | Chen | 280/742 |
| 2004/0126532 | A1 * | 7/2004 | Gardner, Jr. | 428/43 |
| 2005/0046154 | A1 * | 3/2005 | Rhea et al. | 280/728.2 |
| 2005/0116456 | A1 * | 6/2005 | Tajima et al. | 280/751 |
| 2005/0189747 | A1 * | 9/2005 | Khandhadia et al. | 280/730.2 |
| 2006/0186645 | A1 * | 8/2006 | Aulbach | 280/728.2 |
| 2006/0194038 | A1 * | 8/2006 | You et al. | 428/323 |
| 2006/0197326 | A1 * | 9/2006 | Sarmiento et al. | 280/739 |
| 2006/0201369 | A1 * | 9/2006 | Kuroda et al. | 102/289 |
| 2006/0255568 | A1 * | 11/2006 | Demel et al. | 280/728.2 |
| 2007/0296184 | A1 * | 12/2007 | Oestergren | 280/728.2 |

(Continued)

FOREIGN PATENT DOCUMENTS

DE            9016032 U        2/1991

(Continued)

OTHER PUBLICATIONS

Ides, The Plastic Web; Typical properties of Polyolefin; http:www.ides.com/generics/Polyolefin/Polyolefin_typical_properties.htm.*

(Continued)

*Primary Examiner* — Ruth Ilan
*Assistant Examiner* — Karen A Beck
(74) *Attorney, Agent, or Firm* — Lowe Hauptman Ham & Berner LLP (57) ABSTRACT

In a fastener and a fastening system for fixing a curtain airbag in a vehicle, the fastener is fixed to a mounting hole in a body frame or the like of the vehicle by inserting an attachment portion of the fastener into the mounting hole while a head portion securing the attachment of the airbag curtain to the fastener and the vehicle. The fastener is formed as one single piece made from polymeric material.

11 Claims, 5 Drawing Sheets

U.S. PATENT DOCUMENTS

| | | | |
|---|---|---|---|
| 2008/0014045 A1* | 1/2008 | Kawai | 411/45 |
| 2008/0045638 A1* | 2/2008 | Chapman et al. | 524/425 |
| 2008/0197609 A1* | 8/2008 | Jaramillo et al. | 280/730.2 |
| 2008/0197610 A1* | 8/2008 | Downey | 280/730.2 |
| 2008/0206525 A1* | 8/2008 | Jacobs et al. | 428/195.1 |
| 2008/0284141 A1* | 11/2008 | Jang et al. | 280/728.2 |
| 2009/0118414 A1* | 5/2009 | Kitade et al. | 524/451 |
| 2009/0184497 A1* | 7/2009 | Kjell et al. | 280/728.3 |
| 2009/0309339 A1* | 12/2009 | Massot et al. | 280/730.2 |
| 2009/0315304 A1* | 12/2009 | Hagelgans et al. | 280/728.2 |
| 2010/0066060 A1* | 3/2010 | Kalandek | 280/728.2 |

FOREIGN PATENT DOCUMENTS

| | | |
|---|---|---|
| EP | 1878925 A2 | 1/2008 |
| FR | 2764349 A1 | 12/1998 |
| FR | 2818706 A1 | 6/2002 |

OTHER PUBLICATIONS

Basell Service Company, 2007, Compounded Polyolefin; www.basell.com.*

EP Search Report for 07107497.5 dated May 27, 2008.

* cited by examiner

FASTENER FOR AIR-BAG CURTAIN

RELATED APPLICATIONS

The present application is based on, and claims priority from, Swedish Application Number 0601141-5 filed May 19, 2006, the disclosure of which is hereby incorporated by reference herein in its entirety.

TECHNICAL FIELD

The invention relates to a fastener and a fastening system for fixing a curtain airbag to a body panel in a vehicle.

BACKGROUND ART

In vehicles, such as personal cars, it is common practice today to include an airbag curtain. These airbag curtains may for example be attached at the inside of the vehicle at the side panels near the roof. In case of an accident, the curtains are adapted to be activated and thus form a safe guard against hitting the hard parts of the vehicle. In case of a curtain located at the side, its main purpose is to protect the driver or the occupants, in particular in the event of a side impact, from hitting the side panels and the side windows.

When the curtains are activated, there is large force acting on the fastener of the curtain and the panel to which it is attached. In order to be able to securely fasten the curtain to the vehicle, or the vehicle panels, it is needed to make the fastener enough robust to withstand the forces developed at activation of the curtain.

In EP 1 422 112, it is described a fastener for an airbag curtain. According to this fastening system, the airbag is provided with an anchor portion which is attached to a side panel of the car by means of fasteners. Each fastener squeezes the anchor portion between the panel and a flange of the fastener when the curtain is attached to the panel. The fastener is securely attached by means of a tapping screw driven into a shank when the fastener is inserted in a mounting hole.

There are further solutions of fastening an airbag curtain to a panel described in for example EP 1 522 466, EP 1 502 824 and GB 2 364 975 which describes related art to which the present invention is directed.

Even though the above mentioned documents describe different systems that works today there are still further developments which are desired to improve the present fasteners and the present system. The described fasteners do not concern the easiness in mounting of the airbag curtain, neither is it described different aspects of the production process and how to manufacture the elements in a simple way. Hence, there is still a need for an improved fastener and an improved fastening system which take into account the easiness of manufacturing the fastener and to provide a fastener which is easy to mount and take into account different desires in the mounting process of the airbag curtain.

DISCLOSURE OF INVENTION

In one aspect of the invention, the present fasteners are easier to manufacture while still having the desired properties regarding the strength to resist the forces associated with the release when the airbag curtain is activated. In another aspect of the invention, the present fasteners provide a solution which makes the airbag curtain easy to mount. In still another aspect of the invention, it provides a system for mounting of the airbag curtain which makes it easy to adapt the system for different needs of the performance and the easiness of mounting of the fasteners according to different desires.

Hence, such a fastener is described in claim 1. This inventive fastener has several benefits whereof one is that it is easy to manufacture, since it is made in one single piece from polymeric material piece. Furthermore, it is also easy to mount since it is adapted to fit in the mounting hole by introducing a part of the fastener into the hole by hand without the use of a screwdriver or any other tool. This is made possible due to the one-piece formed fastener which is adapted to fit by the use of a snap-in fitting or a hook as will be described in more detail in the description of different embodiments. Event though these relatively simple constructions of the fastener may be similar to fasteners used for other parts in a vehicle, e.g. for fastening of an inner panel to a door or the like things, it has not been tried out until now to make similar components for an airbag curtain. The simple reason for this is that the differences in forces which the elements shall withstand are quite different. In the case of a door panel, there are usually no strong forces at all working on the panel. Hence, these fasteners may be easily done by making a suitable fastener of a wide variety of material, dimensions and shapes while still work well enough to suit its purpose, i.e. holding the panel fixed at its location. However, the forces acting on the fastening elements when the airbag curtain is activated are of a quite different dignity and the fasteners must be adapted to not break at these forces. If such a fastener, which is commonly used for door panels or the like, should be used for an airbag without any modification they should certainly fail to keep the curtain attached to the panel when the curtain is activated.

In the known fasteners for airbag curtains today, all of them are made of several parts of different material in order to provide a reliable fastening of the airbag curtain. In EP 1 422 112 for example, the fastener is attached to the mounting hole by the use of a screw in connection with the moulded plastic part. In addition to function so as to widen the shanks and bring its protrusions to engage with the edges of the mounting hole, the tapping screw will function so as to absorb a part of the reaction forces from the airbag curtain when released.

Until today, there has not been any solution available on the market in which the fasteners are made only of one integral piece of polymeric material which does not need any additional fastening element, e.g. a screw or a metallic clip. As a result of testing of different materials and designing of the constructional details of the fastener, the present invention provides a fastening element for airbag curtains made without the inclusion of any additional or metallic parts.

According to the invention, the material of the fastener should preferably have a modulus of elasticity of at least 3500 MPa, more preferably at least 5000 MPa and most preferably at least 8000 MPa when tested according to ISO 527. For some materials, e.g. polyolefins, the materials may be tested at dry or wet condition and these materials should be tested at dry condition. The modulus of elasticity indicates the possibility of the material to withstand the forces on the fastener. Hence, the higher the modulus of elasticity is, the better the material will withstand the forces working on the fastener. As already mentioned, the forces to be absorbed by the fastener, when the airbag curtain is activated, are quite large and the modulus of elasticity need therefore to be higher than what is usually needed for those fasteners used for fastening of articles in a car. However, a high modulus of elasticity also normally implies a low value of other relevant parameters such as elongation at break and impact strength. Since the fasteners of the present invention are intended to be fastened by some kind of snap-in fastening method or squeezing into the hole, they also need to have acceptable values with regard to these parameters in order to work satisfactorily. In order to manage to solve this problem, most fasteners are made of different kinds of material and it is common practice to use a metal clip as the force absorbing element which is attached to a polymeric material so as to form a fastener for holding the curtain. However, by carefully selecting a polymeric material, it will be possible to make a fastener by moulding which is strong enough to withstand the forces acting on the airbag curtain while still being enough resilient to be mounted. The material used for the fastener should preferably have an elongation at break of at least 2%, more preferably at least 3% and most preferably at least 4% when tested according to ISO 527. As described above, some materials may have a dry or wet condition and these materials should be tested at dry condition. The material should also preferably have an impact strength which, when subjected to a test at minus 30 degrees Celsius according to ISO 179/2-1 eA for testing of the notched impact strength, has a value of at least 7 $kJ/m^2$, more preferably at least 10 $kJ/m^2$ and most preferably at least 12 $kJ/m^2$.

There are several polymeric materials which may be used and one of those materials is polyamide. The polymeric material is preferably modified in order to achieve the desired properties and it may be added a suitable amount of reinforcement material, such as a fibre glass or the like, in an amount of 5-60%, more preferably in an amount of 15-50% and most preferably in an amount of 20-40% in order to achieve a higher modulus of elasticity than the pure polymeric material has. The material may as well include other additives, such as plasticizers or the like, in order to balance the material and achieve the desired properties.

In one embodiment of the invention, the attachment portion is in the form of a hook. In another embodiment, the attachment member comprises a snap-in attaching means which is in the form of resilient shanks which are adapted to be squeezed while inserting the fastener into the hole and expanding so as to secure the fastener. The attachment portion may also be in other forms and may be designed to suite the needs according to individual desires.

In another aspect of the invention, it relates to an airbag curtain fastening system. According to this fastening system, there are several different fasteners, including any of the fasteners described herein, which are essentially of the same dimensions. The critical measures of these fasteners is the fitting of the fastener to the mounting hole so that the different kind of fasteners may be exchanged for each other and fit into the same mounting hole. Such a system may advantageously be used for fastening the airbag curtain when there is a desire for one or the other reason to use different fastener. The reason may for instance be the mountability of the fasteners where it is more convenient to use a certain kind of fastener at one location and another at a different location. Hence, the fasteners of this system are adapted to fit in the same mounting holes and thereby providing alternatives for mounting of the airbag curtain. It is of course not necessary that all these alternatives of fasteners must be of the described type but may also, for example, be of a type having a screw as an attachment aid similar to the fastener described in EP 1 422 112 or a fastener comprising a metallic clip.

In the following examples of the invention, the downward direction is defined as the direction towards the ground when the airbag curtain is mounted in a vehicle. The inwards direction is the direction essentially perpendicular to the plane in which the hole is formed and which the fastener is moved in when the fastener is put into the hole and the outwards direction is the direction which the fastener is moved in when it is detached from the mounting hole.

BRIEF DESCRIPTION OF DRAWINGS

FIG. 1 An airbag curtain mounted in a car
FIG. 2a A cross section of a first embodiment of the fastener according to the invention which also is adapted to fit in the fastening system according to the invention
FIG. 2b An isometric view of the back (fastening portion) of the fastener according to the first embodiment
FIG. 2c An isometric view of the front of the fastener according to the first embodiment
FIG. 3a A cross section of a second embodiment of the fastener according to the invention which also is adapted to fit in the fastening system according to the invention
FIG. 3b An isometric view of the back (fastening portion) of the fastener according to the second embodiment
FIG. 3c An isometric view of the front of the fastener according to the second embodiment
FIG. 4 A fastener with an attached holder
FIG. 5a A cross section of a fastener adapted to fit in the fastening system according to the invention
FIG. 5b An isometric view of the back (fastening portion) of the fastener according to the first embodiment
FIG. 5c An isometric view of the front of the fastener according to the first embodiment

EMBODIMENT(S) OF THE INVENTION

Figure 1:
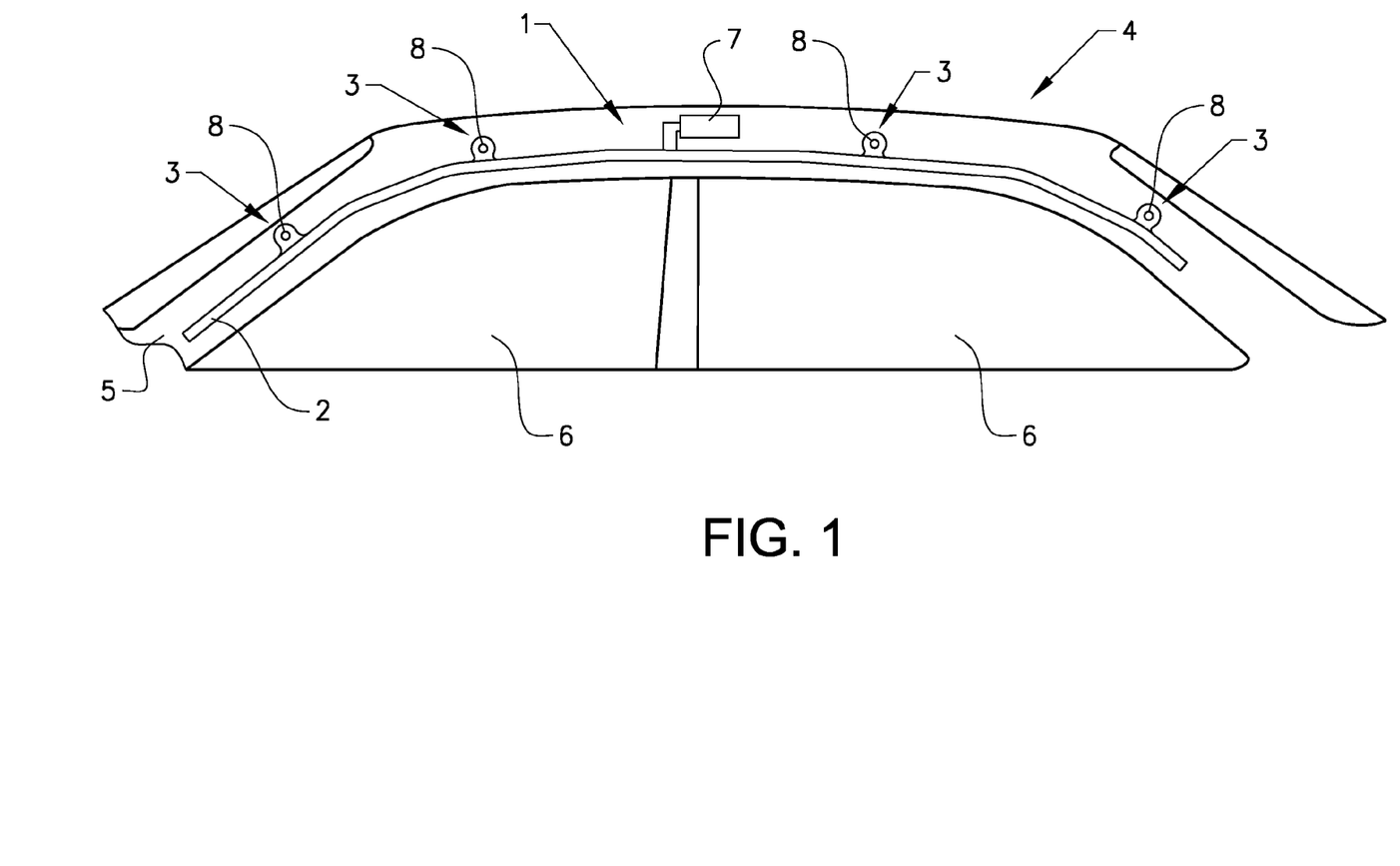

In FIG. 1, it is exemplified how a curtain airbag 1, comprising a main body portion 2 and airbag-anchor portions 3, may be mounted to a car 4. The curtain airbag 1 is intended to protect an occupant of the car 4, and is attached to an interior member, such as a body frame 5, of a car 4 on the upper side of front and rear door windows 6. In a collision, the airbag 2 is activated to suddenly expand, i.e. rapidly deploy, downward along the door windows 6 in response to gas spouting from a compressed gas source, so-called inflator 7, so as to protect the head and body of the occupant. The airbag-anchor portions 3 are fixed to a body panel of an automobile, such as the body frame 5, at a plurality of preformed mounting holes 8 located at the positions of the airbag anchor portions 3 above the windows 6. The main airbag body 2 is normally folded in a compact size and disposed at a fixed position above the door windows 6.

Figure 2A:
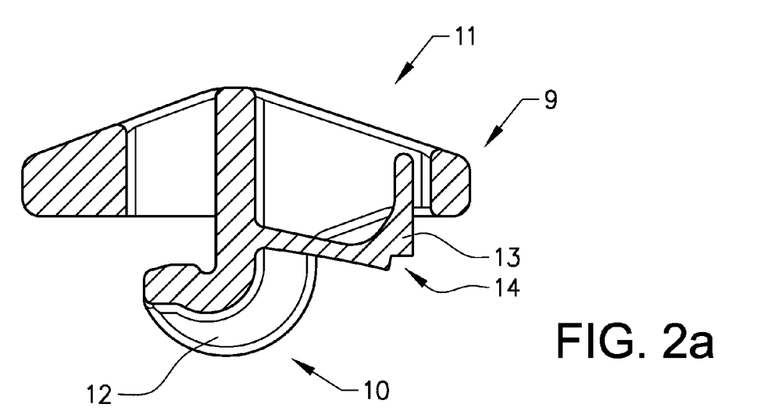
Figure 2B:
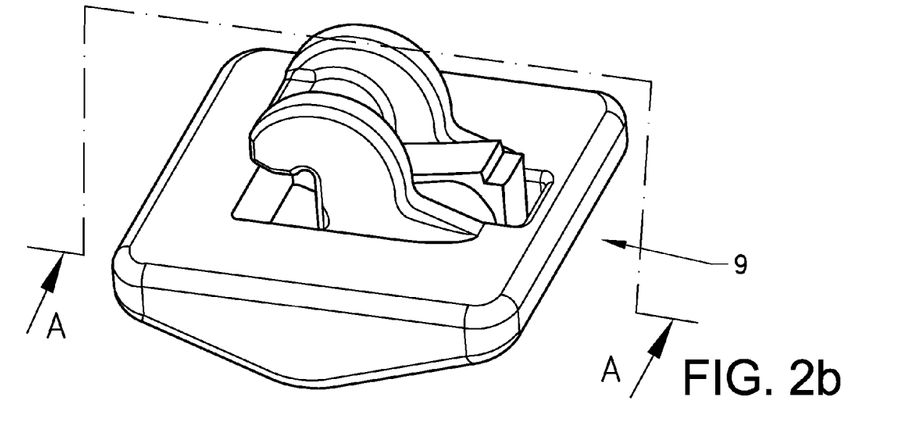

In FIG. 2a, a fastener 9 for fastening of an airbag curtain to a car is shown as an intersectional view along line a-a in FIG. 2b. The fastener 9 comprises an attachment portion 10 intended to be inserted into a mounting hole, and a head portion 11 intended to secure the attachment of the airbag curtain 1 to the car 2 (see FIG. 1). When in use, the airbag curtain is preferably attached by means of clamping a portion of the airbag curtain, e.g. an airbag-anchor portion (see FIG. 1, reference number 3), between the body frame and the head portion 11 and keeping the airbag curtain in place by means of an airbag curtain holder (see FIG. 4 ref number 220) when the attachment portion 10 is inserted and fastened to a mounting hole. The attachment portion 10 comprises a hook 12 and a resilient flange 13 adapted to snap-in in the mounting hole by means of a shoulder 14 in order to fix the fastener 9 to the hole. When the fastener is mounted in the mounting hole it is important that the fastener 9 is mounted so that the hook 12 is hooked on the lower edge part since it is the hook 12 which is adapted to absorb the major part of the forces working on the fastener by its grip around the edge of the mounting hole. The flange 13 functions so as to press the fastener 9 downwards and fix it at the hole while the hook 12 is adapted to absorb the forces working in a downward or outward direction. Hence, this fastener is adapted to absorb a considerably larger force in the downwards-outwards directions than in the upwards-outwards direction.

Figure 2C:
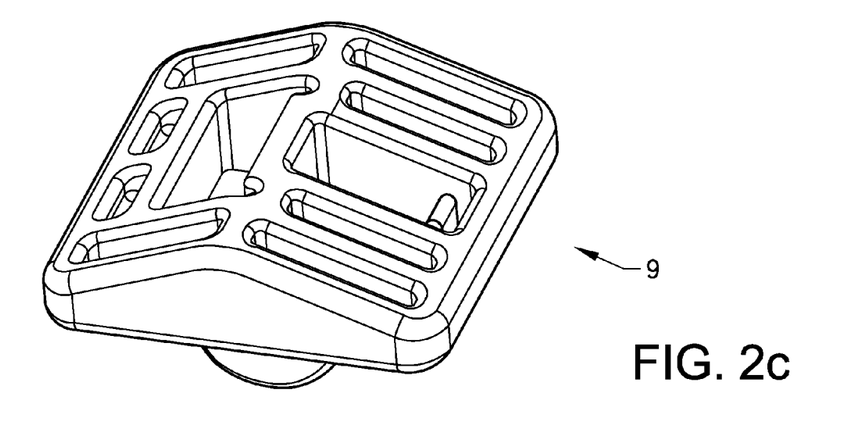

FIGS. 2b and 2c shows another perspective of the fastener 9.

Figure 3A:
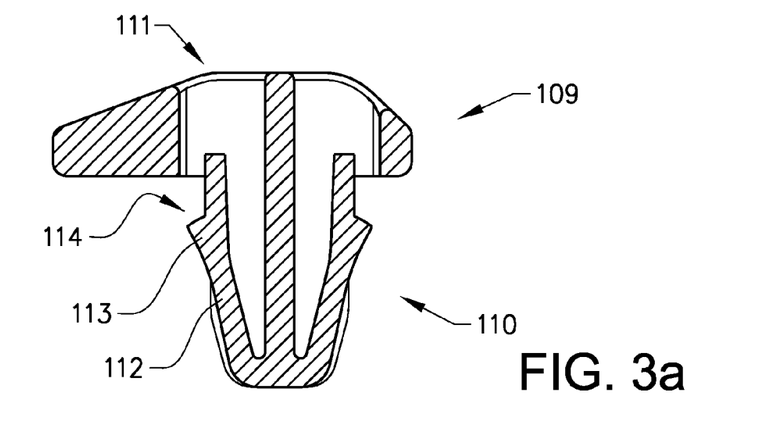
Figure 3B:
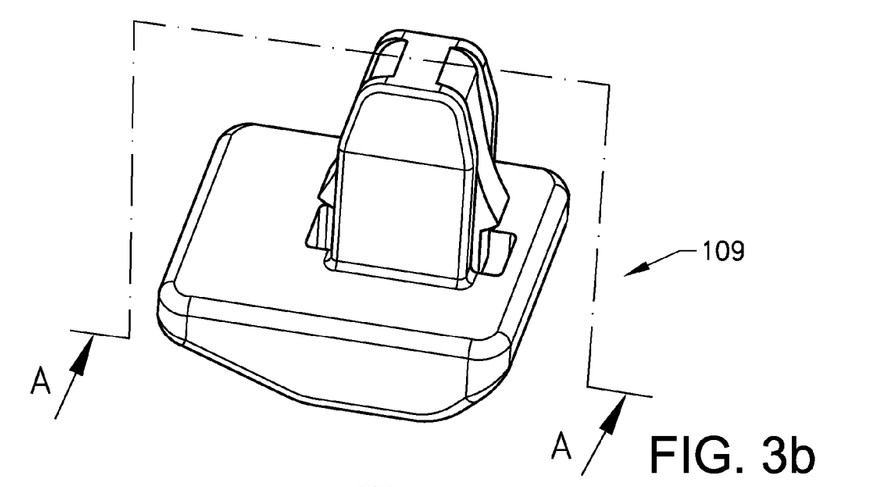

In FIG. 3a, another fastener 109 for fastening of an airbag curtain to a car is shown as an intersectional view along line a-a in FIG. 3b. This fastener 109 also comprises an attachment portion 110 and a head portion 111 which functionalities are as described for the fastener in FIG. 2. The attachment portion 110 comprises a pair of resilient shanks 112. When the fastener 109 is inserted into the mounting hole, the shanks 112 are pressed together and the resilient material will force the shanks apart again when the attachment portion 110 is inserted in the hole. The shanks are further provided with protrusions 113 and a shoulder 114 adapted to fit in with the edges of the mounting hole so as to prevent the detachment of the fastener 109. The shanks 112 are adapted to absorb the forces working in a downward function while the protrusions 113 and the shoulders 114 will prevent the fastener 9 from being detached by forces working in an outward direction.

Figure 3C:
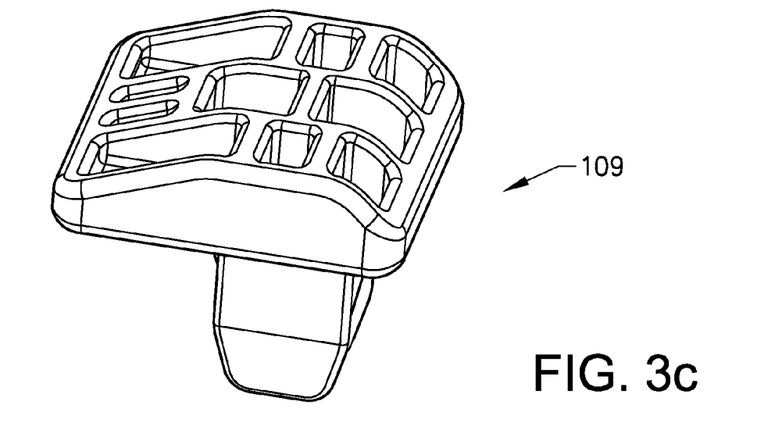

FIGS. 3b and 3c show another perspective of the fastener 109.

Figure 4:
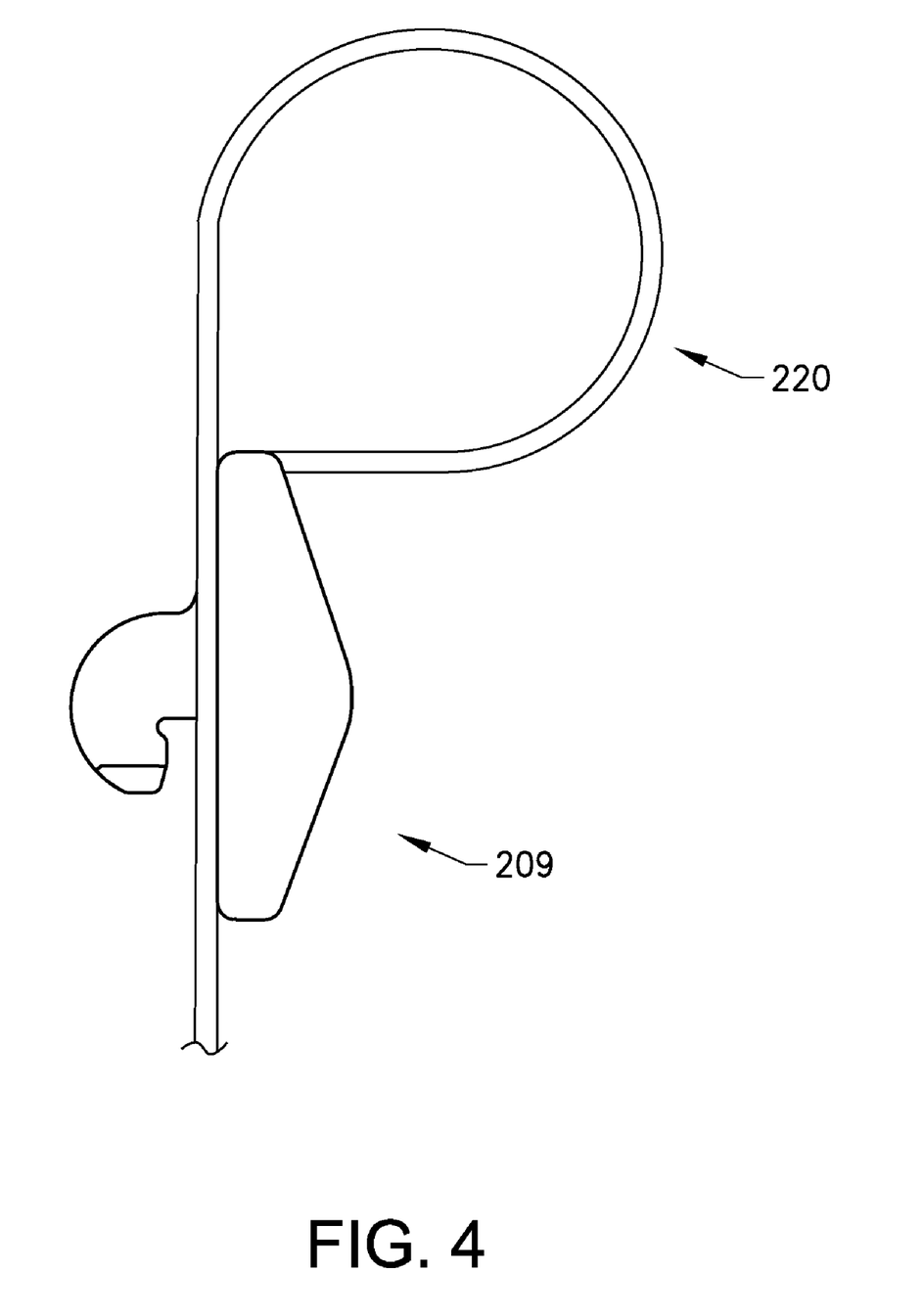

In FIG. 4, it is shown an intersectional view of an embodiment of the invention according to which a fastener 209 is provided with a holder 220. The holder is preferably made of another polymeric material which is adapted to burst when subjected to the forces associated with the activation of the airbag curtain. In this case the fastener is provided with a hook as described in FIG. 2 but the fastener may of course be of any desired kind.

Figure 5A:
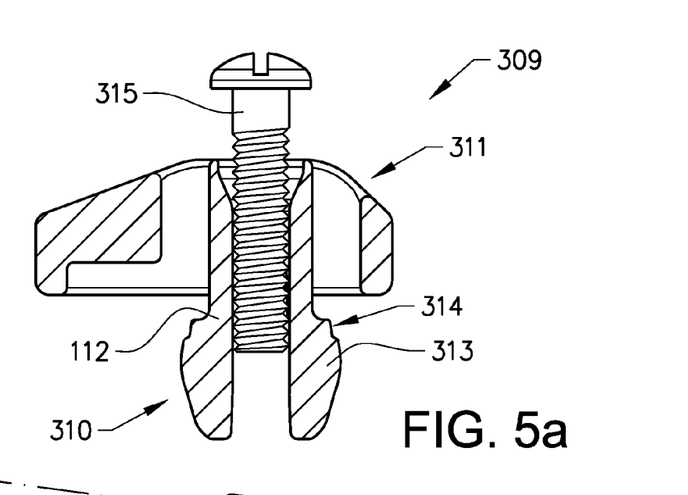
Figure 5B:
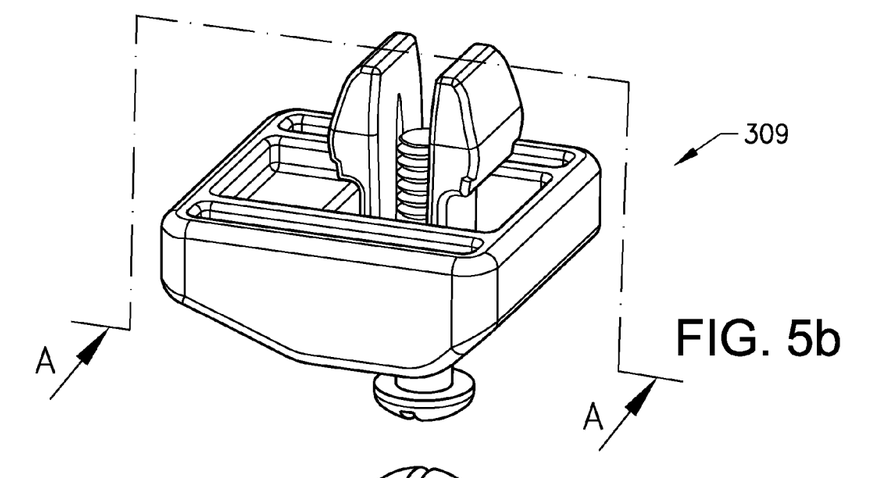

In FIG. 5a, a fastener 309 similar to the one described in EP 1 422 112 is described and is shown as an intersectional view along line a-a in FIG. 5b. The fastener 309 may form a part of the fastening system herein described. This fastener 309 also comprises an attachment portion 310 and a head portion 311 which functions as described for the fastener in FIG. 2. The attachment portion 310 comprises a pair of resilient shanks 312. When the fastener 309 is inserted into the mounting hole, the shanks 312 are pressed together and the resilient material will force the shanks apart again when the attachment portion 310 is inserted in the hole. The shanks are further provided with protrusions 313 and a shoulder 314 adapted to fit in with the edges of the mounting hole so as to prevent the detachment of the fastener 309. In addition, this fastener is provided with a screw 315 which shall be screwed into the fastener so as to spread the shanks and provide a support for them. Hence, the shanks 312 are supported by the screw 315 in absorbing the forces working in a downward direction when the airbag curtain is activated. Furthermore, the screw 315 is spreading the shanks 312 so that the protrusions 313 and the shoulders 314 are pressed against the edges of the mounting hole so as to prevent the fastener 309 from being detached by forces working in an outward direction.

Figure 5C:
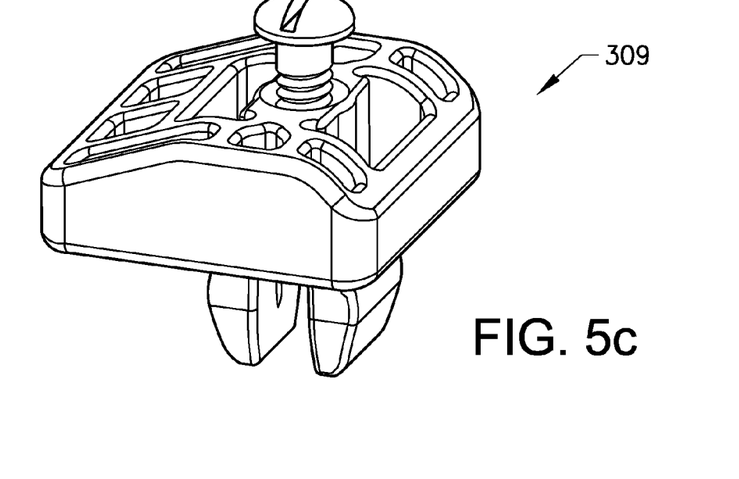

By giving all the fasteners described in FIGS. 2, 3 and 5 appropriate dimensions, they may be used in the mounting system described herein. The fastening portions shall in this case have a form and dimension which make them interchangeable for the same kind of holes. Depending on different situations, it might be desired to use different fasteners, e.g. it might be desired to use fasteners which only have a snap-in fitting at locations where it is hard to mount while it might be desired to use fasteners provided with a screw where it is desired to control the mounting force by measuring the screw torque.

There are of course further possibilities of embodiments of the fastener according to the invention. It would be obvious for the skilled person in the art to construct and design other fasteners which are entirely made from a polymeric material and moulded in one piece than the ones shown in FIGS. 2 and 3. It is further obvious that it is possible for the skilled person to provide still further embodiments of the fastener than the ones described herein to fit within the system and being adapted to be interchangeable to fit in the same mounting hole.

The invention claimed is:

1. A curtain airbag fastener configured to fasten an airbag curtain to a frame of a vehicle by fixing the fastener to a mounting hole in the frame of the vehicle, the fastener comprising:
   a snap-in attachment portion to be inserted into the mounting hole; and
   a head portion configured to securely attach the airbag curtain to the fastener;
   wherein the fastener is formed as one single piece made from polymeric material;
   wherein the attachment portion includes a hook having two side portions connected at a front end and a resilient flange extending from a recessed backside of the hook between said two side portions, the resilient flange having a stepped shoulder at an end thereof oppositely facing said hook;
   wherein the attachment portion is configured to snap into the mounting hole, whereby the hook engages a lower edge of the mounting hole by hooking the lower edge and the stepped shoulder is configured to engage an upper and inside edge of the mounting hole on an opposite side of the hole than the hook; and
   wherein the fastener is configured to absorb a larger force in a downward and outward direction with respect to the frame than a force in an upward and outward direction.

2. A fastener according to claim 1, wherein the fastener is molded integrally in its entirety and is able to secure the attachment to the mounting hole without any further component.

3. A fastener according to claim 1, wherein the material used for the fastener has a modulus of elasticity of 3500-8000 MPa.

4. A fastener according to claim 3, wherein the material used for the fastener has an elongation at break of 2-4%.

5. A fastener according to claim 3, wherein the material used for the fastener has a notched impact strength of 7-12 kJ/m2 when tested at minus 30 degrees Celsius.

6. A fastener according to claim 1, wherein the material used for the fastener comprises a polyamide as the main polymer of the material for the fastener.

7. A fastener according to claim 1, wherein the material used for the fastener comprises a reinforcement additive, in an amount of 20-40%.

8. A fastener according to claim 1, wherein the material used for the fastener comprises a plasticizer as an additive.

9. A fastener according to claim 1, wherein the fastener is configured to withstand a force of 300-700 Newtons in an outward direction when mounted in an airbag curtain vehicle mounting hole.

10. A method of fastening an airbag curtain to a vehicle, the method comprising:
   snap inserting a hook portion of a fastener into a locked position within a mounting hole in a body frame of a vehicle, wherein the fastener includes an oppositely facing flange extending from a central backside portion of the hook portion between two side portions thereof, the resilient flange having a stepped shoulder at an end of the resilient flange oppositely facing the hook portion; and engaging a lower edge of the mounting hole with the hook portion by hooking the lower edge and engaging an upper and opposite edge of the mounting hole with the flange and stepped shoulder, whereby the fastener is snapped into the mounting hole, thereby fixing the fastener at the hole;

wherein the fastener is configured to absorb a larger force in a downward and outward direction with respect to the body frame than in an upward and outward direction.

11. A curtain airbag system, comprising:

a curtain airbag having a main body portion and airbag-anchor portions, the airbag-anchor portions configured to be affixed to a body panel of a vehicle at a plurality of preformed mounting holes; and a plurality of snap fasteners each configured to fasten one of the airbag-anchor portions to a respective preformed mounting hole in the plurality of preformed mounting holes, each fastener comprising:

an attachment portion to be inserted into the mounting hole; and a head portion configured to secure the attachment of the airbag curtain to the fastener;

wherein the snap fastener is formed as one single piece made from polymeric material;

wherein the attachment portion includes a single hook having two side portions connected at a front end and a single resilient flange extending from a recessed backside of the hook between said two side portions, the resilient flange having a stepped shoulder at an end thereof oppositely facing said hook;

wherein the attachment portion is configured to snap in the mounting hole whereby the hook engages a lower edge of the mounting hole by hooking the lower edge and the stepped shoulder is configured to engage an upper and inside edge of the mounting hole on an opposite side of the hole than the hook; and wherein the fastener is configured to absorb a larger force in a downward and outward direction in respect to the body panel than a force in an upward and outward direction.

* * * * *